United States Patent
Du et al.

(10) Patent No.: US 12,351,497 B2
(45) Date of Patent: Jul. 8, 2025

(54) METHODS AND SYSTEMS FOR TREATING PHOSPHOGYPSUM-CONTAINING WATER

(71) Applicant: Evoqua Water Technolgies LLC, Pittsburgh, PA (US)

(72) Inventors: Wenxin Du, Dover, NH (US); Hao Dang, Dracut, MA (US); George Y. Gu, Andover, MA (US); Michael J. Shaw, Derry, NH (US); Simon P. Dukes, Chelmsford, MA (US); Justin Wayne Higgs, Nolensville, TN (US)

(73) Assignee: EVOQUA WATER TECHNOLOGIES LLC, Pittsburgh, PA (US)

( * ) Notice: Subject to any disclaimer, the term of this patent is extended or adjusted under 35 U.S.C. 154(b) by 124 days.

(21) Appl. No.: 17/276,352

(22) PCT Filed: Aug. 21, 2019

(86) PCT No.: PCT/US2019/047558
§ 371 (c)(1),
(2) Date: Jun. 15, 2021

(87) PCT Pub. No.: WO2020/041507
PCT Pub. Date: Feb. 27, 2020

(65) Prior Publication Data
US 2023/0145108 A1    May 11, 2023

Related U.S. Application Data

(60) Provisional application No. 62/846,952, filed on May 13, 2019, provisional application No. 62/844,173, (Continued)

(51) Int. Cl.
C02F 1/20 (2023.01)
C02F 1/44 (2023.01)
(Continued)

(52) U.S. Cl.
CPC .............. *C02F 9/00* (2013.01); *C02F 1/20* (2013.01); *C02F 1/441* (2013.01); *C02F 1/444* (2013.01);
(Continued)

(58) Field of Classification Search
CPC .... C02F 9/00; C02F 1/20; C02F 1/441; C02F 1/444; C02F 2101/105; C02F 2101/16;
(Continued)

(56) References Cited

U.S. PATENT DOCUMENTS 4,392,959 A * 7/1983 Coillet ...................... C02F 9/00
                                                              210/651
6,652,758 B2   11/2003 Krulik
(Continued)

FOREIGN PATENT DOCUMENTS

CN      1880217 A  * 12/2006  ............. C01B 25/30
CN    102328984 A  *  1/2012  ................ C02F 1/66
(Continued)

OTHER PUBLICATIONS

Full English Translation of Chen et al Publication CN188-0217A, published Dec. 2006. (Year: 2006).*
(Continued)

*Primary Examiner* — Joseph W Drodge
(74) *Attorney, Agent, or Firm* — Lando & Anastasi, LLP

(57) ABSTRACT

Methods for treating phosphogypsum-containing water are disclosed. The water may be treated so as to promote precipitation of one or more target constituents and to facilitate downstream membrane treatment. A coagulant may be added to promote phosphate recovery. Ammonia may optionally be removed. Related systems are also disclosed.

17 Claims, 4 Drawing Sheets

Related U.S. Application Data filed on May 7, 2019, provisional application No. 62/798,696, filed on Jan. 30, 2019, provisional application No. 62/770,470, filed on Nov. 21, 2018, provisional application No. 62/720,566, filed on Aug. 21, 2018.

(51) Int. Cl.
| | | |
|---|---|---|
| *C02F 1/461* | (2023.01) | |
| *C02F 9/00* | (2023.01) | |
| *C05C 1/00* | (2006.01) | |
| *C02F 101/10* | (2006.01) | |
| *C02F 101/16* | (2006.01) | |

(52) U.S. Cl.
CPC ............... *C02F 1/461* (2013.01); *C05C 1/00* (2013.01); *C02F 2101/105* (2013.01); *C02F 2101/16* (2013.01); *C02F 2209/06* (2013.01)

(58) Field of Classification Search
CPC ........ C02F 2209/06; C02F 1/44; C02F 1/442; C02F 1/52; C02F 1/5209; C02F 1/5245; C02F 1/58; C02F 1/586; C02F 1/66; C02F 2101/10; C02F 2101/101; C02F 2101/12; C02F 2101/14; C02F 2103/34; C02F 2301/046; C02F 2301/08; C02F 2209/02; C02F 2209/05; C02F 2209/055; C02F 2209/40; C02F 1/4602; C02F 1/461; C02F 1/469; C02F 1/4693; C05C 1/00; C05C 11/00

See application file for complete search history.

(56) References Cited

U.S. PATENT DOCUMENTS

| | | | |
|---|---|---|---|
| 6,916,427 | B2 | 7/2005 | Roth |
| 2009/0306451 | A1 | 12/2009 | Cerea |
| 2011/0127223 | A1 | 6/2011 | Astley et al. |
| 2011/0132839 | A1 | 6/2011 | Zuback et al. |
| 2012/0070360 | A1 | 3/2012 | Wissemborski et al. |
| 2012/0315209 | A1 * | 12/2012 | Bisson .................. B01D 61/58 422/187 |
| 2013/0062289 | A1 * | 3/2013 | Cote ..................... C02F 1/5236 210/723 |
| 2014/0231359 | A1 | 8/2014 | Cote et al. |
| 2015/0308001 | A1 | 10/2015 | Barak |
| 2015/0368137 | A1 | 12/2015 | Miller et al. |
| 2016/0002082 | A1 | 1/2016 | Yin et al. |
| 2017/0113957 | A1 | 4/2017 | Eckelberry |
| 2017/0362102 | A1 | 12/2017 | Ganzi |
| 2022/0259085 | A1 | 8/2022 | Dang et al. |
| 2023/0145108 | A1 | 5/2023 | Du et al. |

FOREIGN PATENT DOCUMENTS

| | | | | |
|---|---|---|---|---|
| CN | 106966467 | A * | 7/2017 | .............. C02F 1/461 |
| CN | 107381892 | A * | 11/2017 | .............. C02F 1/461 |
| KR | 100556686 | B1 * | 3/2006 | ............... C02F 1/24 |
| WO | 2005118222 | A2 | 12/2005 | |
| WO | WO-2007148954 | A1 * | 12/2007 | .............. C02F 1/463 |
| WO | WO-2014136651 | A1 * | 9/2014 | ........... B01D 61/025 |
| WO | WO2015000462 | A1 * | 1/2015 | .............. C02F 1/461 |
| WO | WO-2016201563 | A1 * | 12/2016 | ............. B01D 61/44 |

OTHER PUBLICATIONS

Full English Translation of Wen et al Publication CN102328984A, published Jan. 2012. (Year: 2012).*
Issiouy et al., "Thermal treatment of moroccan phosphogypsum", Published by Chemical Department, Faculty of Sciences, Ibn Zohr University, B.P. 8106, Agadir 80000, Morocco, full text in foreign language with English Abstract, published Mar. 2013. (Year: 2013).*
Full English Translation of Choi et al Publication KR10556686B1, published Mar. 2006. (Year: 2006).*
Full English Translation of Venier Publication WO2015000462A1, published Jan. 2015. (Year: 2015).*
Full English Translation of Yang et al Publication CN106966467A, published Jul. 2017. (Year: 2017).*
Full English Translation of Hu Publication CN107381892A, published Nov. 2017. (Year: 2017).*
English Translation of Alcocer Patent Publication WO 2007/148954, published Dec. 2007. (Year: 2007).*
English Translation of Patent Publication WO2014136651, Sep. 12, 2014 (Year: 2014).*
Perpich Jr, Bill, et al., "Mobile Wastewater Treatment Helps Remediate Concentrated Acidic Process Water at Fertilizer Plant", Florida Water Resources Journal, Jul. 1, 2005, p. 26.
Da Silva, Gilson, "Search Report", Brazilian application No. 112021003131-6, mailed Feb. 1, 2023, 8 pages.
Thomas, Shane, "International Search Report & Written Opinion", International Patent Application No. PCT/US19/47558, mailed Nov. 8, 2019, 13 pages.
Kobayashi, Miki, "International Preliminary Report on Patentability", International Patent Application No. PCT/US2019/047558, mailed Feb. 23, 2021, 1 page.
Da Silva, Gilson, "Examination Report", Brazilian Patent Application No. BR112021003110-3, mailed May 16, 2023, 7 pages.
Samad, "Investigation of the Radiological Impact on the Coastal Environment Surrounding a Fertilizer Plant", Journal of Environmental Radioactivity, pp. 69-74 (2014).
Sadrzadeh, Mohtada et al., "Sea water desalination using electrodialysis", Science Direct, Desalination 221, pp. 440-447 (2008).
El-Ghafari, Rasha, "Requisition by the Examiner in Accordance With Subsection 86(2) of The Patent Rules", Canadian Patent Application No. 3107313, mailed Jan. 7, 2025.
El-Ghafari, Rasha, "Requisition by the Examiner in Accordance With Subsection 86(2) of The Patent Rules", Canadian Patent Application No. 3107306, mailed Jan. 7, 2025.
El-Ghafari, Rasha, "Requisition by the Examiner in Accordance With Subsection 86(2) of the Patent Rules", Canadian Patent Application No. 3107164, mailed Dec. 20, 2024.
Dias-Abey, Asoka, "Examination Report No. 1", Australian Patent Application No. 2019325324, mailed Jul. 3, 2024.

* cited by examiner

METHODS AND SYSTEMS FOR TREATING PHOSPHOGYPSUM-CONTAINING WATER

CROSS-REFERENCE TO RELATED APPLICATIONS

This application claims priority to U.S. Provisional Patent Application Ser. No. 62/720,566 filed on Aug. 21, 2018 and titled "METHOD AND SYSTEM TO TREAT PHOSPHOGYPSUM CONTAINING WASTEWATER," U.S. Provisional Patent Application Ser. No. 62/770,470 filed on Nov. 21, 2018 and titled "IMPROVED LIMING PROCESS OF ACIDIC WATER FOR PHOSPHATE RECOVERY AND SCALING REDUCTION FOR DOWNSTREAM PROCESSES," U.S. Provisional Patent Application Ser. No. 62/798,696 filed on Jan. 30, 2019 and titled "AMMONIA/AMMONIUM REDUCTION DURING INDUSTRIAL ACIDIC WASTEWATER TREATMENT," and U.S. Provisional Patent Application Ser. No. 62/846,952 filed on May 13, 2019 and titled "USING MONO-VALENT CATION SELECTIVE AND ANION ION EXCHANGE MEMBRANES IN ELECTRODIALYSIS TO TREAT DOUBLE LIME TREATED POND WATER," the entire disclosure of each of which is hereby incorporated herein by reference in its entirety for all purposes.

FIELD OF THE TECHNOLOGY

Aspects relate generally to water treatment and, more specifically, to the treatment of water containing phosphogypsum.

BACKGROUND

Phosphoric acid is a precursor compound in the manufacture of various common fertilizers. Phosphogypsum is a side product from the production of phosphoric acid by treating phosphate ore with sulfuric acid. The reaction produces phosphogypsum sludge, phosphoric acid, and a byproduct liquid stream. The byproduct stream is typically reused for cooling but ultimately stored in large open-air enclosures called phosphogypsum stacks or ponds.

This wastewater associated with and produced by phosphate manufacturing operations is typically acidic and typically contains various dissolved constituents such as fluoride, ammonia, silica, sulfate, calcium, heavy metals, phosphate, magnesium, colloidal matter, organic carbon, and, in some instances, radium (a radioactive element). The ponds associated with phosphate processing contain billions of gallons of this wastewater, e.g. 3 billion gallons each. Due to increasingly strict environmental regulations and annual rainfall, the stacks must be treated and closed by the operating companies. The pond water has become one of the largest liabilities of phosphoric acid producers. There is an urgent environmental need to treat this wastewater, particularly in environmentally sensitive areas, or areas where population growth has come into closer contact with phosphate processing sites. Treatment of this wastewater to reduce its toxicity and its volume has been a technological challenge of significant interest. The toxic or harmful contaminants must be either reduced or eliminated before treated water can be discharged into the environment.

One conventional approach that may be used to dispose of phosphogypsum wastewater is deep well injection. This process injects the wastewater deep underground between impermeable layers of rocks to avoid polluting fresh water supplies. Proper geology is required for deep well injection sites, and a permit must be obtained prior to injecting the process water underground. Further, phosphate is not recoverable from process water in a deep well injection process.

SUMMARY

In accordance with one or more aspects, a method of treating phosphogypsum-containing water is disclosed. The method may comprise promoting precipitation of at least one target constituent from the phosphogypsum-containing water to produce a supernatant water, introducing a free metal or salt thereof to the supernatant water to provide a pretreated supernatant water, subjecting the pretreated supernatant water to membrane separation to produce treated water having at least one predetermined discharge requirement and a concentrate stream, removing ammonia from at least one of the pretreated supernatant water and the concentrate stream, and discharging the treated water.

In some aspects, precipitation is promoted in a multi-stage process. Calcium and/or magnesium may be precipitated in a first precipitation step. Phosphate may be precipitated in a second precipitation step. The method may further comprise adjusting a pH level of the phosphogypsum-containing water to a first pH level in the first precipitation step. The method may further comprise adjusting the first pH level to a second pH level in the second precipitation step. In some aspects, the method may further comprise a third precipitation step.

In some aspects, the method may further comprise recovering calcium fluoride from a precipitation slurry associated with the first precipitation step. Likewise, the method may further comprise recovering phosphate from a precipitation slurry associated with the second precipitation step.

In some aspects, the free metal or salt thereof may be introduced to the supernatant water via chemical or electrolytic addition. The free metal or salt thereof may be an aluminum salt or an iron salt. The method may further comprise recovering phosphate from the pretreated supernatant following introduction of the free metal or salt thereof.

In some aspects, the membrane separation may involve one or more of nanofiltration, ultrafiltration, and reverse osmosis. The membrane separation may involve reverse osmosis and one of nanofiltration and ultrafiltration.

In some aspects, the predetermined discharge requirement pertains to a phosphorous or silica level. The method may further comprise recycling at least one reject stream back to a source of the phosphogypsum-containing water.

In some aspects, ammonia may be removed from the concentrate stream. Ammonia may be removed from the pretreated supernatant water. An ammonia concentration at a source of the phosphogypsum-containing water may be maintained or reduced. In at least some aspects, at least 90% of ammonia is recovered. The method may further comprise delivering the recovered ammonia as a fertilizer product.

In accordance with one or more embodiments, a system for treating phosphogypsum-containing water is disclosed. The system may comprise a source of phosphogypsum-containing water, a pretreatment subsystem comprising at least one precipitation unit fluidly connected downstream of the phosphogypsum-containing water source, a source of a coagulant comprising a free metal or salt thereof fluidly connected to the pretreatment subsystem, a membrane separation subsystem fluidly connected downstream of the pretreatment subsystem and configured to produce treated water having at least one predetermined discharge requirement, an ammonia removal subsystem in fluid communication with the membrane separation subsystem, and a treated water outlet.

In some aspects, the pretreatment subsystem may comprise at least two precipitation units. The source of the coagulant may comprise an electrocoagulation subsystem.

In some aspects, the membrane separation subsystem may comprise one or more of a nanofilter, an ultrafilter, and a reverse osmosis unit. The membrane separation subsystem may comprise a reverse osmosis unit and one of a nanofilter and an ultrafilter.

In some aspects, the pretreatment subsystem may further comprises at least one clarifier. The pretreatment subsystem may further comprise at least one filter press. The pretreatment subsystem may further comprise a settling pond.

In some aspects, the system may further comprise a sensor configured to detect at least one operational parameter associated with the water source, the pretreatment subsystem, the membrane separation subsystem, or the treated water outlet. The sensor may be a flow rate, pH, temperature, conductivity, hardness, or concentration sensor.

In some aspects, the system may further comprise a controller in communication with the at least one sensor and configured to adjust at least one operational parameter of the system. The controller may be configured to adjust a flow rate or pH level in response to input from the sensor. The controller may be configured to adjust fractionation among the at least one precipitation unit in order to optimize phosphate recovery. The controller may be configured to adjust an amount of the coagulant introduced in order to optimize phosphate recovery.

In some aspects, the ammonia removal subsystem may be configured to remove ammonia from a concentrate stream associated with the membrane separation subsystem. The ammonia removal subsystem may be configured to remove ammonia upstream of the membrane separation subsystem. The ammonia removal subsystem may be configured to maintain or reduce an ammonia concentration at the source of phosphogypsum-containing water. In certain aspects, the ammonia removal subsystem may be configured to recover ammonia at a rate of at least 90%. The ammonia removal subsystem may comprise a gas transfer membrane contactor.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
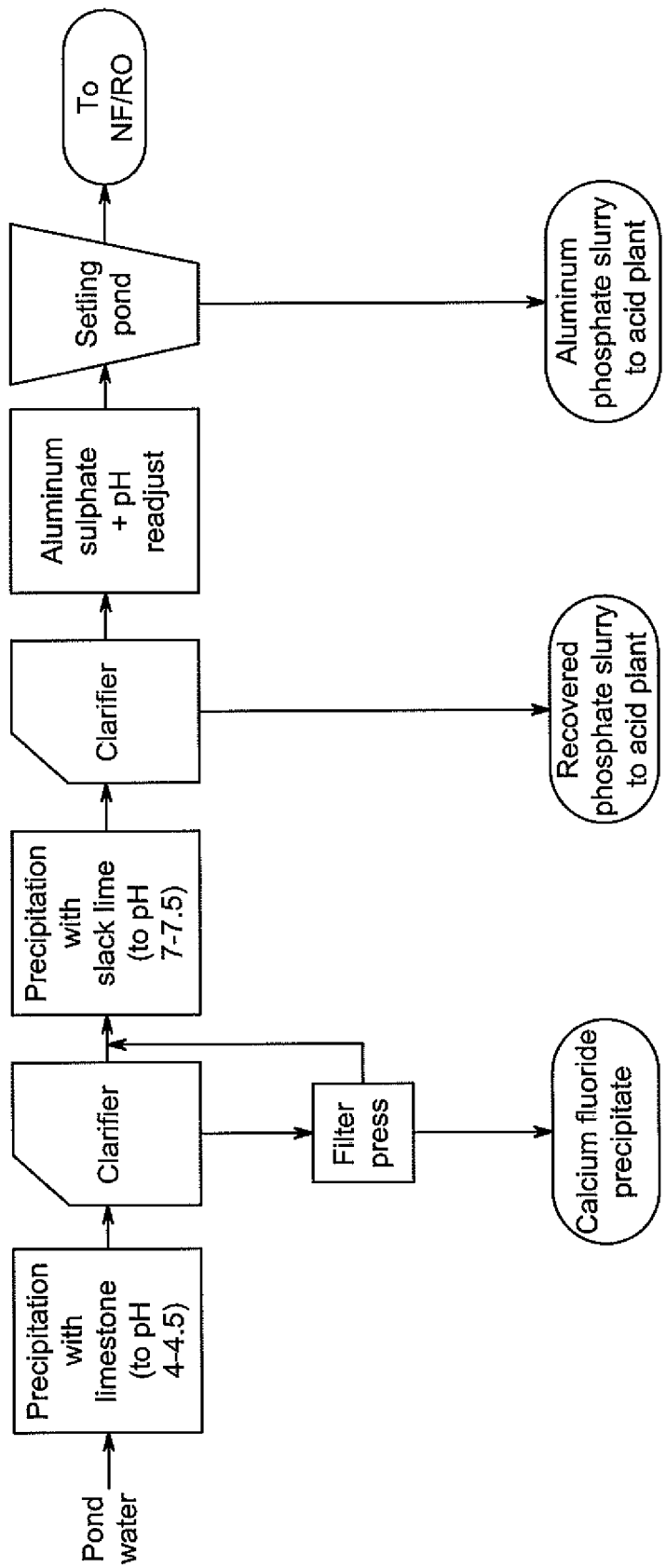
FIG. 1-2 present process flow diagrams in accordance with one or more disclosed embodiments.

In accordance with one or more embodiments, water containing phosphogypsum may be efficiently brought to within preestablished environmental discharge limits. As used herein, the term phosphogypsum-containing water may interchangeably be referred to herein as wastewater or process water. Relevant discharge limits may be established by various local, state, federal, or private agencies. For example, the State of Florida has set a maximum conductivity limit of 1,275 μS/cm for National Pollutant Discharge Elimination System (NPDES) permitting. Conventionally, phosphogypsum wastewater may be treated and diluted by up to five to ten times in order to meet conductivity, concentration, and/or load-based limits for ammonia, fluoride, phosphorous, or other constituents. The water consumed for dilution is typically fresh or treated water that could be used for other purposes. The dilution water may be relatively expensive treated water, such as reverse osmosis product water. In at least some embodiments, a cost competitive alternative to conventional treatment methods is presented. In some embodiments, consumption of fresh water associated with environmental discharge may desirably be reduced. In at least some embodiments, there is no dilution prior to discharge.

In accordance with one or more embodiments, various product streams (i.e. phosphoric acid, calcium carbonate, and/or ammonium sulfate) may beneficially be recovered in conjunction with the wastewater treatment. In some embodiments, overall recovery rates may be significantly increased. In certain embodiments, a recovery rate of at least about 30%, 40%, 50%, or more may be achieved.

In accordance with one or more embodiments, phosphogypsum wastewater may originate from a phosphate manufacturing operation and be stored in a pond or stack. The phosphogypsum wastewater may be highly acidic, i.e. having a pH level of about 1.5 to about 2 and environmentally hazardous. A non-limiting example of the typical chemical composition of pond water is presented in Table 1. Beyond what is presented, the ammonia concentration may range from a few hundred ppm up to a few thousand ppm.

TABLE 1

| Parameter* | Range |
| --- | --- |
| pH, Standard Units | 1.6-2.1 |
| Total Acidity as $CaCO_3$ | 20,000-60,000 |
| Fluoride, as F | 4,000-12,000 |
| Phosphorus, as P | 4,000-9,000 |
| Silicon, as Si | 1,000-3,000 |
| Total Solids | 20,000-50,000 |
| Total Suspended Solids | 50-250 |
| Conductivity, umhos | 15,000-40,000 |
| Chlorides, as Cl | 50-500 |
| Sulfates, as $SO_4$ | 2,000-12,000 |
| Sodium, as Na | 50-3,000 |
| Calcium, as Ca | 50-1,500 |
| Magnesium, as Mg | 50-400 |
| Aluminum, as Al | 50-1.000 |
| Chrome, as Cr | 0.2-5.0 |
| Zinc, as Zn | 1.0-5.0 |
| Iron, as Fe | 100-250 |
| Manganese, as Mn | 5-30 |
| $NH_3$—N, as N | 0-1,200 |
| Total Organic N, as N | 3-30 |
| Color, APHA units | 20-4,000 |

*All values expressed as mg/L unless otherwise noted.

In accordance with one or more embodiments, wastewater containing phosphogypsum may be pretreated. Pretreatment may promote the removal of at least one target species and/or adjust one or more operational parameters in order to facilitate downstream operations. A pretreated supernatant may be delivered to downstream unit operations for further treatment.

In accordance with one or more embodiments, pretreatment may involve precipitation. Precipitation may be strategically staged so as to promote the removal of various target constituents in series. Different target constituents may precipitate out under different conditions. For example, a first target constituent may precipitate out at a first pH condition and a second target constituent may precipitate out at a second pH condition.

In accordance with one or more embodiments, pretreatment may involve adjusting a hardness level. In some non-limiting embodiments, magnesium and/or calcium levels may be targeted. The hardness level may be adjusted via precipitation in a first pretreatment stage.

In accordance with one or more embodiments, pretreatment may involve phosphate removal. Phosphate removal may be promoted via precipitation in a second pretreatment stage.

In accordance with one or more embodiments, pretreatment may involve adjusting a process stream to a first pH level in a first pretreatment stage to promote precipitation of a first target constituent. Pretreatment may subsequently involve adjusting a process stream to a second pH level from the first pH level in a second pretreatment stage to promote precipitation of a second target constituent.

In accordance with one or more embodiments, pretreatment may involve further promoting the recovery of one or more constituents, such as phosphorous or silica. In some embodiments, a coagulant may be introduced. In certain embodiments, a free metal or salt thereof may be strategically dosed as a coagulant. In some embodiments, an aluminum salt (i.e. aluminum sulfate) or an iron salt may be dosed as a coagulant. In at least some non-limiting embodiments, a multivalent metal coagulant may be strategically dosed.

In accordance with one or more embodiments, the coagulant may be introduced through chemical or electrolytic addition. Since the process water may contain saturated amounts of silica, among other species, addition of the free metals may coagulate and reduce silica levels to acceptable levels for downstream membrane processes. Chemical addition may involve addition of aluminum sulfate, sodium aluminate, iron chloride, or other catalyst. Electrolytic addition may involve electrolysis of anodes consisting of aluminum, other aluminum composites, iron/steel, or other material. As an example, any aluminum or iron salts available on the market (e.g. $Al_2(SO_4)_3$, $AlCl_3$, $NaAlO_2$, $Al(NO_3)_3$ can be possibly utilized as coagulant to reduce the silica content. It is possible to combine the salts that are acidic in aqueous solution and the ones that are basic together to reduce or eliminate the pH adjustment afterwards, e.g. $Al(SO_4)_3 + NaAlO_2$.

In accordance with one or more embodiments, pretreatment may significantly increase the recovery efficiency of downstream unit operations. In some embodiments, pretreatment may be performed upstream of a membrane separation subsystem as further described herein.

Figure 2:
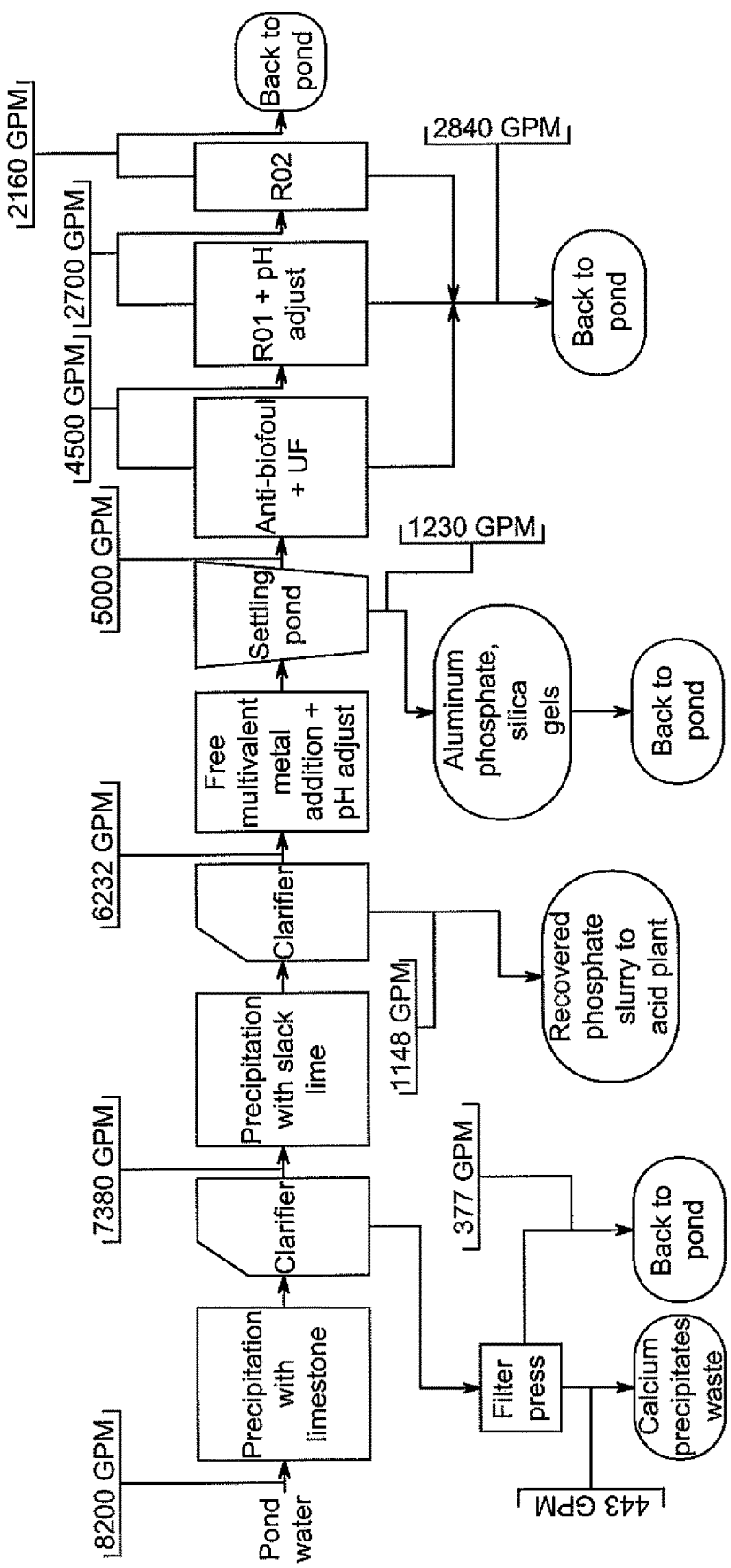

A process flow diagram in accordance with one or more non-limiting embodiments is presented in FIG. 1. A first compound (i.e. limestone) may be introduced to achieve a first target pH level in order to promote a first precipitation. Clarification and filter press or any other related techniques known to those of skill in the art may be used to recover a first precipitate (i.e. calcium fluoride). The first precipitation may generally reduce a hardness level of a process stream entering a second precipitation. A second compound (i.e. slack lime) may be introduced to achieve a second target pH level in order to promote the second precipitation. The second pH level may generally be different than the first pH level. In at least some embodiments, the second pH level may be higher than the first pH level. The second precipitation may generally promote precipitation of a phosphate slurry that may be delivered for further processing and recovery. A coagulant may then be added to further promote phosphate recovery. A coagulant-dosed process stream may be introduced to a settling pond for a predetermined period of time, i.e. several hours. A pH level of a process stream in the settling pond may optionally be readjusted. The settling operation may generally promote precipitation of an additional phosphate slurry that may be delivered for further processing and recovery. A pretreated supernatant may then be delivered downstream for further processing, i.e. via membrane separation. For example, non-limiting membrane separation operations may include one or more of ultrafiltration (UF), nanofiltration (NF), and reverse osmosis (RO). FIG. 1 presents an embodiment in which NF and RO are implemented in series. FIG. 2. presents an alternative embodiment in which UF and staged RO are implemented in series.

Figure 3:
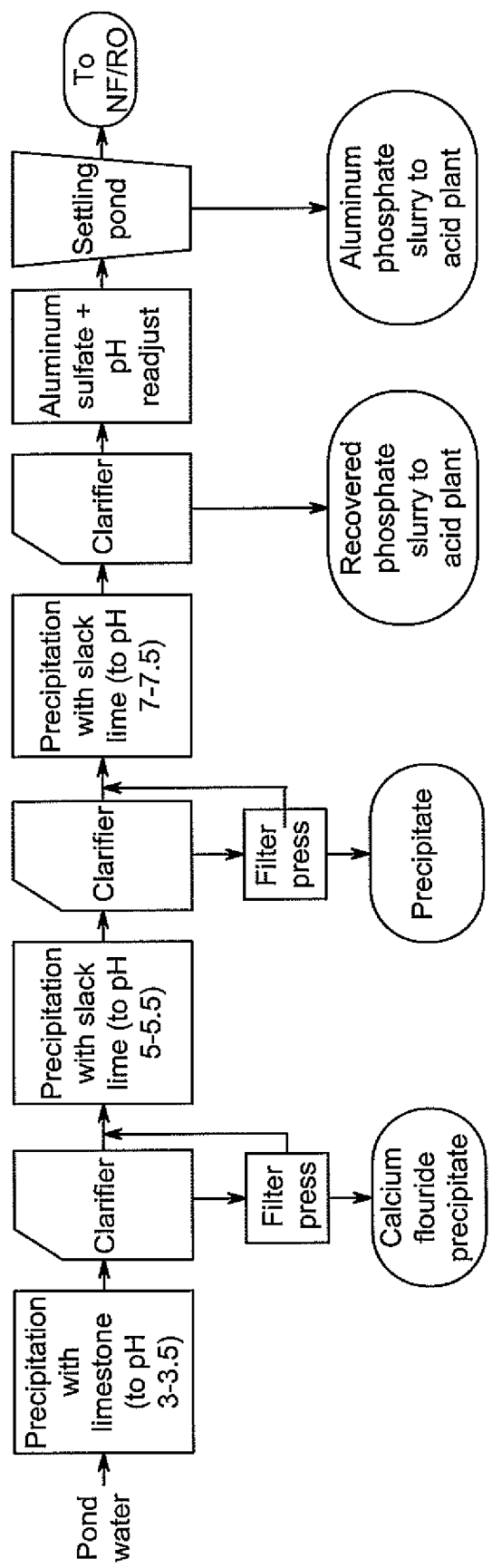
FIG. 3 presents a process flow diagram including an additional solids removal step in accordance with one or more disclosed embodiments.

In accordance with one or more embodiments, an additional solid waste recovery step may be incorporated as presented in FIG. 3. The additional solid waste recovery step may be associated with an intermediate pH level between the first and second pH levels.

In accordance with one or more embodiments, various pretreatment stages may be strategically controlled in order to promote recovery of various target compounds. Downstream recovery process may also be optimized. In some embodiments, an amount of coagulant, i.e. aluminum, added may be strategically controlled in order to optimize phosphate recovery and downstream processes. In some embodiments, fractionation (i.e. pH stopping points) associated with pretreatment precipitation may be strategically controlled to optimize recovery and downstream processes. Waiting periods, i.e. within clarifiers and the settling pond time can also be optimized or reduced.

Ammonia/ammonium may become increasingly concentrated or enriched over time as various reject streams from membrane processes are recycled back to the pond. In accordance with one or more embodiments, systems and methods may beneficially remove ammonia.

In accordance with one or more embodiments, ammonia stripping and/or recovery processes may be strategically integrated. For example, ammonia may be removed downstream of any silica or phosphate reduction process. Alternatively or in addition, ammonia may also be removed from reject streams associated with various membrane processes. A flow rate of an ammonia stripping/recovery process may be strategically adjusted such that an ammonia concentration or content of the pond can be maintained or reduced rather than increased. In some non-limiting embodiments, ammonia removal may be accomplished via membrane degasification, i.e. with a gas transfer membrane contactor. For example, a Liqui-Cel™ gas transfer membrane contactor commercially available from 3M Company may be implemented. In some embodiments, the gas transfer membrane contactor may remove about 90% to about 99% of ammonia from a process stream. In at least some embodiments, ammonia sulfate may be recovered.

Figure 4:
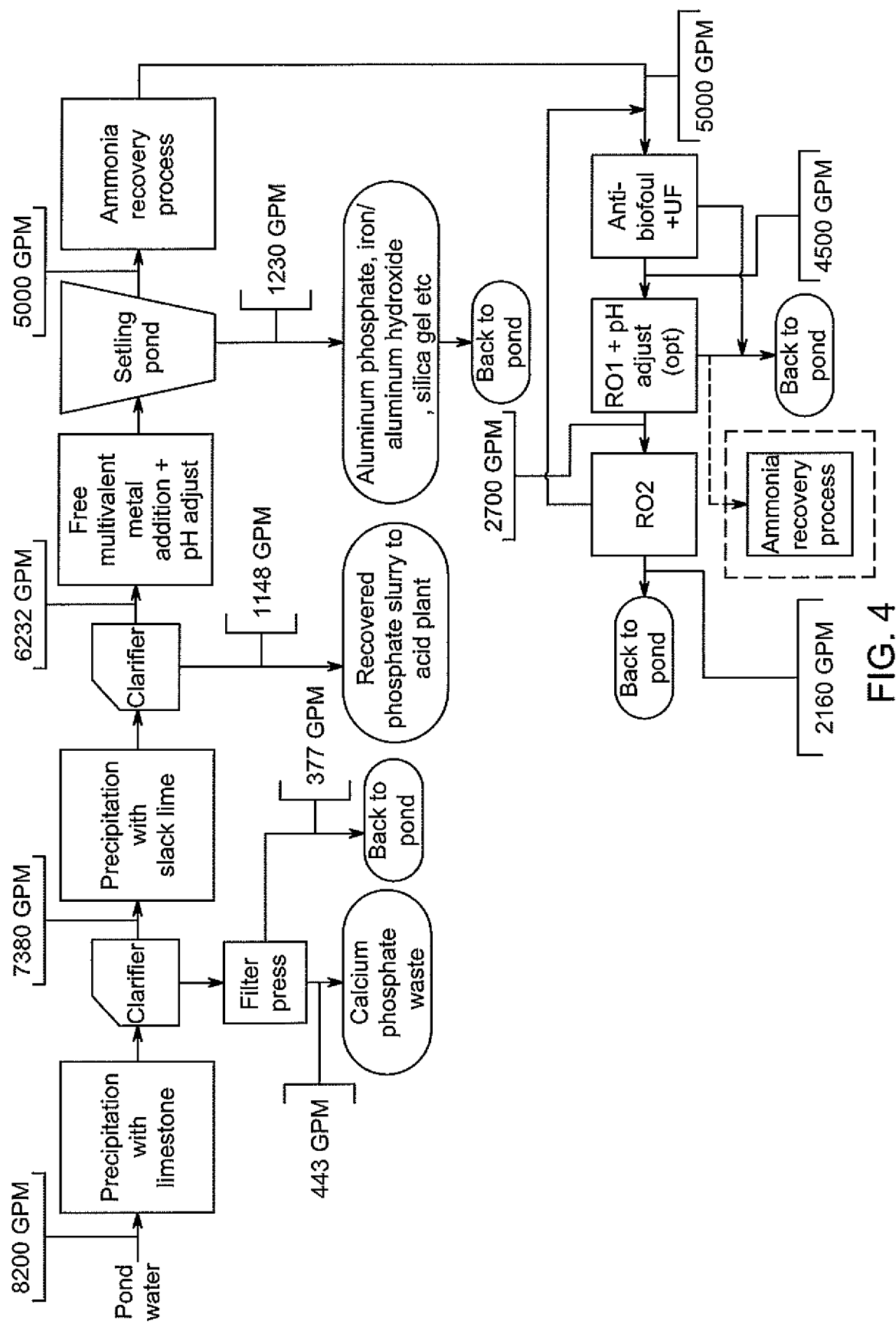
FIG. 4 presents a process flow diagram including ammonia removal operations in accordance with one or more disclosed embodiments.

FIG. 4 presents a process flow diagram in accordance with one or more embodiments implementing an ammonia stripping/recovery process. Alternative positions for ammonia removal are indicated. The ammonia/ammonium concentration can beneficially be maintained relatively stable or reduced. This may make it possible to deal with a simpler stack closure task at a later stage, as well as to recover the value of ammonia/ammonium as ammonium sulfate fertilizer.

In accordance with one or more embodiments, a treatment system may include at least one sensor configured to detect an operational parameter. For example, the sensor may be configured to detect an operational parameter associated with the source of pond water, the pretreatment system, i.e. a precipitation subsystem, the membrane subsystem, the ammonia removal subsystem, or the treated water outlet. In some non-limiting embodiments, the sensor may be a flow rate, pH, temperature, conductivity, hardness, or concentration sensor. In some embodiments, two or more sensors, e.g. a plurality of sensors, may be incorporated. The sensors may be strategically positioned throughout the system. The sensors may be interrelated and/or interconnected, for example, with respect to process control. The system may further include a controller in communication with the at least one sensor. The controller may be configured to provide a control signal in response to input from the sensor. For example, the controller may provide a control signal to actuate or adjust a valve of the system or subsystem thereof. In some non-limiting embodiments, the controller may be configured to adjust a flow rate or pH level in response to input from the sensor. The controller may adjust coagulant addition in response to sensor input. In this way, the controller may enable adjustment of one or more process parameters so as to produce one or more desirable product streams. In some non-limiting embodiments, the controller may adjust flow to a membrane contactor, for example, to promote ammonia sulfate recovery as described herein. The controller may be further configured to make a comparison between a measured value and a predetermined value, such as an established discharge requirement and to adjust various control settings accordingly.

The function and advantages of these and other embodiments can be better understood from the following examples. The examples are intended to be illustrative in nature and are not considered to be limiting the scope of the invention.

Example 1

A process flow diagram according to FIG. 1 was lab tested and modelled. A projected water analysis from modelling is shown in Table 2A.

Phosphogypsum-containing sample pond water having a pH of about 2.7 was reacted with limestone to a target pH level of 4-4.5 on a bench-scale. After settling for approximately 20 minutes, the slurry was filtered to recover water to be combined with a supernatant decanted effluent stream (for increased overall water recovery). The solids were projected to have amounts of calcium fluoride, calcium phosphate, silica precipitates, to be further treated as solid waste. Further treatment of the combined supernatant from pH 4-4.5 to a target pH level of 7-7.5 was performed using slack lime $(Ca(OH)_2)$ on the lab bench. This second precipitation step yielded a sizable portion of calcium phosphate precipitates. This slurry from the second clarifier is to be pumped to an upstream acid plant for recovery of phosphate. The value of the recovered phosphate to an active plant is considerable and should be noted. The supernatant that has been decanted from the second precipitation step after settling for approximately 20 minutes follows a third precipitation step. To reduce the silica and the phosphate in the second supernatant solution, aluminum was added as aluminum sulfate. Lab results of alum additions are shown in Table 2B for reduction in SiO2 levels. The reduction of the silica facilitates higher water recovery operations upstream. This treated supernatant was then introduced to a settling pond to settle out aluminum phosphate slurry, which may be further treated for recovery of phosphate, or be considered as solid waste. Effluent from the settling pond may be filtered in downstream NF/RO.

TABLE 2A

| Parameter | Unit | Feed (Apr. 10, 2018) | Supernatant from Precipitation#1 | Supernatant from Precipitation#2 | Supernatant from Precipitation#3 |
|---|---|---|---|---|---|
| Volume of sample | mL | 50 | 43 | 34 | 35 |
| Mass of precipitate | g, dry | — | 3.53 | 1.07 | 0.2 |
| Calcium | mg/l as CaCO3 | 3310 | 4625 | 320 | 146 |
| Magnesium | mg/l as CaCO3 | 1510 | 915 | 43 | 34 |
| Sodium | mg/l as CaCO3 | 5490 | 6150 | 6150 | 6150 |
| Potassium | mg/l as CaCO3 | 370 | 500 | 500 | 500 |
| Iron | mg/l | 169 | 0.0 | 0.0 | 0.0 |
| Manganese | mg/l | 25 | 2.2 | 2.2 | 2.2 |
| Aluminum | mg/l | 161 | 0.1 | 0.1 | 0.1 |
| Barium | mg/l | 0 | 1.9 | 1.9 | 1.9 |
| Strontium | mg/l | 48 | 48 | 48 | 48 |
| Copper | mg/l | 0 | — | — | — |
| Zinc | mg/l | 18 | — | — | — |
| Bicarbonate | mg/l as CaCO3 | — | — | — | — |
| Fluoride | mg/l as CaCO3 | 19500 | 81 | 52 | 0 |
| Chloride | mg/l as CaCO3 | 262 | 262 | 262 | 262 |
| Bromide | mg/l as CaCO3 | 0 | — | — | — |
| Nitrate | mg/l as CaCO3 | 46 | 12.3 | 12.3 | 12.3 |
| Phosphate | mg/l as CaCO3 | 51500 | 22430 | 4966 | 2092 |
| Sulfate | mg/l as CaCO3 | 7840 | 5097 | 4815 | 4911 |
| pH |  | 2.7 | 4.5 | 7.4 | 7.1 |
| Turbidity | NTU | 28 | — | — | — |
| Conductivity | µS/cm | 36900 | — | — | — |
| Total Hardness | mg/l as CaCO3 | 4631 | — | — | — |
| TOC | mg/l | 192 | 53 | 53 | 53 |
| Mineral Acidity | mg/l as CaCO3 | 26864 | — | — | — |
| Ammonia | mg/l as CaCO3 | 4531 | 4531 | 4531 | <4531 |
| Total Silica | mg/l as CaCO3 | 3045 | 451 | 183 | 101 |
| Total Acidity | mg/l as CaCO3 | 47633 | — | — | — |

TABLE 2B

| pH | Time Elapsed (hr) | Ratio Al:SiO2 (mass) Al | SiO2 | SiO2 (mg/L) |
|---|---|---|---|---|
| 3.5 | 4.5 | 1 | 2 | 614 |
| 3.5 | 20 | 1 | 2 | 379 |
| 3.5 | 20 | 1 | 2 | 346 |
| 4.5 | 4.5 | 1 | 2 | 445 |
| 4.5 | 20 | 1 | 2 | 285 |
| 4.5 | 20 | 1 | 2 | 281 |
| 5.5 | 4.5 | 1 | 2 | 330 |
| 5.5 | 20 | 1 | 2 | 253 |
| 5.5 | 20 | 1 | 2 | 288 |
| 5.5 | 16 | 5 | 1 | 609 |
| 5.5 | 16 | 5 | 1 | 560 |
| 7.3 | 16 | 6 | 1 | 80 |
| 7.3 | 16 | 6 | 1 | 86 |
| 7.3 | 17 | 2 | 1 | 17 |
| 7.3 | 17 | 2 | 1 | 17 |
| 7.6 | 17 | 1 | 2 | 19 |
| 7.6 | 17 | 1 | 2 | 18 |
| 8.9 | 17 | 1 | 8 | 83 |
| 8.9 | 17 | 1 | 8 | 86 |
| 7.3 | 4 | N/A | N/A | 186 |
| 7.3 | 4 | N/A | N/A | 184 |
| 7.3 | 94 | N/A | N/A | 155 |
| 7.3 | 94 | N/A | N/A | 151 |
| 7.3 | 18 | 1 | 8 | 131 |
| 7.3 | 18 | 1 | 8 | 131 |
| 6.7 | 18 | 1 | 8 | 177 |
| 6.7 | 18 | 1 | 8 | 175 |
| 7.3 | 18 | 1 | 2 | 27 |
| 7.3 | 18 | 1 | 2 | 27 |
| 7.3 | 18 | 1 | 4 | 78 |

Example 2

A process flow diagram according to FIG. 2 was lab tested and modelled for scale-up. A summary of scaled-up stream compositions can be seen on Table 3A. Phosphogypsum-containing sample pond water (500 mL) having a pH of about 2.0 was reacted with limestone (20.5 g) at ambient temperature to a target pH level of 3.8. After settling for approximately 30 minutes, the slurry was filtered to recover water to be combined with a supernatant decanted effluent stream (for increased overall water recovery, 90% liquid volume relative to feed). The solids were analyzed to have amounts of fluoride, phosphate, silica, and magnesium, >98%, >40%, 80%, and >25% by wt %, respectively, to be further treated as solid waste. Further treatment of the combined supernatant from pH 3.8 to a target pH level of 7.4 was performed using slack lime ($Ca(OH)_2$, 4 g) on the lab bench. This second precipitation step yielded a sizable portion of calcium phosphate precipitates (>45% phosphate wt % relative to feed). This slurry from the second clarifier is to be pumped to an upstream acid plant for recovery of phosphate. The value of the recovered phosphate to an active plant is considerable and would contribute to the overall economics. The supernatant that has been decanted (>75% of liquid volume relative to feed) from the second precipitation step after settling for approximately 30 minutes follows a third precipitation step. To reduce the silica and the phosphate in the second supernatant solution, electrocoagulation (EC) was used. (EC) was evaluated to reduce silica content in phosphogypsum-containing water without increasing the TDS burden. An electrocoagulation reactor was used with 15 mL/min flow of sample water with residence time of 30 minutes at varying current. The data on Table 3B clearly showed that EC can reduce silica in a much shorter time frame and more effective fashion compared to traditional chemical coagulation. Table 3C presents treated data and Table 3D presents control data.

In addition, the results further showed that EC (using aluminum electrodes) does not introduce excessive aluminum ions into the treated water which is highly desirable for downstream membrane processes to operate at higher recoveries. This treated supernatant was settled for 30 minutes and decanted. The precipitates from the EC step may be further treated for recovery of phosphate or be considered as solid waste. Effluent from the settling was analyzed via internal laboratory and an industrial projection software was used to model downstream membrane processes. Downstream membrane processes were modelled to be a UF followed by 2-pass RO system. Water recoveries for the UF and the 2-pass RO are 90%, 60%, and 80%, respectively. The $1^{st}$ pass RO uses SH30H-380 membranes and contains 1 stage with 112 pressure vessels (to achieve the scaled-up flowrates). The $2^{nd}$ pass RO uses BW30-400 membranes and contains 2 stages with 48 pressure vessels in each stage. Operating conditions for both passes are ambient 25 C with the first pass being low-pH RO and near neutral pH RO for the second pass. Antiscalant may be required and thus was modelled into the process. Chemtreat antiscalant was used at a dose of 8.7 mg/L going into the $1^{st}$ pass RO. There may be pH adjustment before going to the $1^{st}$ pass RO, thus sulfuric acid may be used to bring down the pH. $2^{nd}$ pass RO permeate is projected to meet NPDES discharge limits, and in some cases only a single pass RO is needed.

TABLE 3A

| Parameter | Unit | Pond Feed (Sep. 17, 2018) | Supernatant from Precipitation #1 | Supernatant from Precipitation #2 | Supernatant from Precipitation #3 | UF | Unit | RO1 Permeate | RO2 Permeate | RO1 Reject | RO2 Reject | Slurry from Precip. 2 | Silica Gel |
|---|---|---|---|---|---|---|---|---|---|---|---|---|---|
| Volumetric Flow | GPM | 6959 | 6207 | 5559 | 4460 | 5000 | | 3375 | 2160 | 1800 | 540 | 648 | 1099 |
| Calcium | mg/L as CaCO3 | 3050 | 4625 | 320 | 3.57 | 3.57 | mg/L as ion | 0.02 | 0.00 | 71.13 | 0.10 | 41552 | 1604 |
| Magnesium | mg/L as CaCO3 | 1110 | 916 | 43 | 13.9 | 13.9 | mg/L as ion | 0.00 | 0.00 | 8.45 | 0.00 | 8411 | 159 |
| Sodium | mg/L as CaCO3 | 5620 | 6150 | 6150 | 5010 | 5010 | mg/L as ion | 3.59 | 0.04 | 5791.01 | 17.80 | 6150 | 10777 |
| Potassium | mg/L as CaCO3 | 450 | 500 | 500 | 290 | 290 | mg/L as ion | 1.99 | 0.08 | 564.07 | 9.62 | 500 | 1352 |
| Iron | mg/L as ion | 80 | 0 | 0 | 0.02 | 0.02 | mg/L as ion | 0.00 | 0.00 | 0 | 0.00 | 0 | 0 |

TABLE 3A-continued

| Parameter | Unit | Pond Feed (Sep. 17, 2018) | Supernatant from Precipitiation #1 | Supernatant from Precipitiation #2 | Supernatant from Precipitiation #3 | UF | Unit | RO1 Permeate | RO2 Permeate | RO1 Reject | RO2 Reject | Slurry from Precip. 2 | Silica Gel |
|---|---|---|---|---|---|---|---|---|---|---|---|---|---|
| Manganese | mg/L as ion | 14 | 2 | 2 | 0.01 | 0.01 | | NA | 0.00 | NA | 0.00 | 2 | 11 |
| Aluminum | mg/L as ion | 108 | 0 | 0 | 0.08 | 0.08 | | NA | 0.00 | NA | 0.00 | 0 | |
| Strontium | mg/L as ion | 39 | 2 | 2 | 0.03 | 0.03 | | 0.00 | 0.00 | 0.07 | 0.00 | 2 | 9 |
| HCO3 | mg/L as CaCO3 | <0.5 | | | 574.4 | 574.4 | mg/L as ion | 5.52 | 1.31 | 1718.62 | 26.26 | 0 | −2331 |
| Bromide | mg/L as CaCO3 | <3 | | | 6.05 | 6.05 | | NA | NA | NA | NA | 0 | −25 |
| Fluoride | mg/L as CaCO3 | 19000 | 81 | 52 | 1 | 1 | mg/L as ion | 0.00 | 0.00 | 0.95 | 0.00 | 327 | 258 |
| Chloride | mg/L as CaCO3 | 147 | 262 | 262 | 190 | 190 | mg/L as ion | 0.85 | 0.02 | 336.27 | 4.17 | 262 | 554 |
| Nitrate | mg/L as CaCO3 | 25 | 12 | 12 | 15.4 | 15.4 | mg/L as ion | 1.15 | 0.28 | 45.77 | 4.64 | 12 | 0 |
| Phosphate | mg/L as CaCO3 | 34100 | 22430 | 4966 | 1190 | 1190 | mg/L as ion | 1.08 | 0.04 | 2103.34 | 8.02 | 172233 | 20290 |
| Sulfate | mg/L as CaCO3 | 7150 | 5097 | 4815 | 5910 | 5910 | mg/L as ion | 11.56 | 0.74 | 15869.9 | 131.10 | 7512 | 373 |
| pH | s.u. | 2.0 | 3.8 | 7.4 | 8.54 | 8.54 | s.u | 5.21 | 4.63 | 7.15 | 5.84 | | |
| TDS | mg/L as ion | 49863 | | | | | mg/L as ion | 28.17 | 2.81 | 30773 | 255.68 | | |
| Ammonia | mg/L as CaCO3 | 4089 | 4089 | 4089 | 3325.01 | 3325.01 | mg/L as ion | 9.64 | 0.34 | 3001.78 | 46.83 | 4089.00 | |
| Total Silica | mg/L as CaCO3 | 2233 | 451 | 183 | 49.29 | 49.29 | mg/L as ion | 0.60 | 0.01 | 146.62 | 2.96 | 2750.3 | 723.63 |

TABLE 3B

| Trial No. | Current (A) | Residence Time (min) | Electrode Configuration | Silica In (ppm) | Silica Out (ppm) | Silica Reduction (ppm) |
|---|---|---|---|---|---|---|
| 1 | 0.5 | 31 | Al(+) \| Al \| Al \| Al(−) | 113 | 67 | 46 |
| 2 | 1.0 | 31 | Al(+) \| Al \| Al \| Al(−) | 156 | 62 | 94 |
| 3 | 1.0 | 31 | Fe(+) \| Fe \| Fe \| Fe(−) | 156 | 120 | 36 |
| 4 | 0.5 | 31 | Fe(+) \| Fe \| Fe \| Fe(−) | 156 | 123 | 33 |
| 5 | 1.0 | 31 | Al(+) \| Fe \| Al \| Fe(−) | 147 | 28 | 119 |
| 14 | 1.0 | 31 | Al(+) \| Al \| Al(−) | 142 | 69 | 73 |

TABLE 3C

| TESTS | RESULT | UNITS |
|---|---|---|
| Aluminum (Al) | 0.077 | mg/l |
| Bicarb (HCO3) | 574.4 | mg/l CaCO3 |
| Bromide (Br) | 6.05 | mg/l CaCO3 |
| Carbonate (CO3) | 232.9 | mg/l CaCO3 |
| Chloride (Cl) | 100 | mg/l CaCO3 |
| Fluoride (F) | <1.00 | mg/l CaCO3 |
| Hydroxide (OH) | 0.0 | mg/l CaCO3 |
| Nitrate (NO3) | 15.4 | mg/l CaCO3 |
| Phosphate (PO4) | 1190 | mg/l CaCO3 |
| Sulfate (SO4) | 5910 | mg/l CaCO3 |
| Barium (Ba) | <0.050 | mg/l |
| Calcium (Ca) | 3.57 | mg/l CaCO3 |
| Iron (Fe) | <0.020 | mg/l |
| Magnesium (Mg) | 13.9 | mg/l CaCO3 |
| Manganese (Mn) | <0.010 | mg/l |
| Potassium (K) | 290 | mg/l CaCO3 |
| Sodium (Na) | 5010 | mg/l CaCO3 |
| Free (CO2) | 5.3 | mg/l CaCO3 |
| Copper (Cu) | <0.020 | mg/l |
| Ammonia (NH3) | 2248 | mg/l CaCO3 |
| pH | 8.54 | |
| Total Silica (SiO2) | 49.29 | mg/l CaCO3 |
| Silicon (Si) | 28 | mg/l |
| Strontium (Sr) | 0.031 | mg/l |
| Zinc (Zn) | 0.023 | mg/l |

TABLE 3D

| TESTS | RESULT | UNITS |
|---|---|---|
| Aluminum (Al) | 0.087 | mg/l |
| Bicarb (HCO3) | 1352.2 | mg/l CaCO3 |
| Bromide (Br) | 8.17 | mg/l CaCO3 |
| Carbonate (CO3) | 0.0 | mg/l CaCO3 |
| Chloride (Cl) | 200 | mg/l CaCO3 |
| Fluoride (F) | <1.00 | mg/l CaCO3 |
| Hydroxide (OH) | 0.0 | mg/l CaCO3 |
| Nitrate (NO3) | 21.6 | mg/l CaCO3 |
| Phosphate (PO4) | 4470 | mg/l CaCO3 |
| Sulfate (SO4) | 5890 | mg/l CaCO3 |
| Barium (Ba) | <0.050 | mg/l |
| Calcium (Ca) | 6.27 | mg/l CaCO3 |

TABLE 3D-continued

| TESTS | RESULT | UNITS |
|---|---|---|
| Iron (Fe) | <0.020 | mg/l |
| Magnesium (Mg) | 11.5 | mg/l CaCO3 |
| Manganese (Mn) | <0.010 | mg/l |
| Potassium (K) | 310 | mg/l CaCO3 |
| Sodium (Na) | 5310 | mg/l CaCO3 |
| Free (CO2) | 58.4 | mg/l CaCO3 |
| Copper (Cu) | <0.020 | mg/l |
| Ammonia (NH3) | 3325 | mg/l CaCO3 |
| pH | 7.78 | |
| Total Silica (SiO2) | 119.13 | mg/l CaCO3 |
| Silicon (Si) | 87 | mg/l |
| Strontium (Sr) | 0.032 | mg/l |
| Zinc (Zn) | <0.020 | mg/l |

Table 4 shows the results on silica concentration with a 1:1 ratio of silica to alum as a coagulant.

TABLE 4

| TESTS | RESULT | UNITS |
|---|---|---|
| Aluminum (Al) | 0.281 | mg/l |
| Bicarb (HCO3) | 474.4 | mg/l CaCO3 |
| Bromide (Br) | 6.04 | mg/l CaCO3 |
| Carbonate (CO3) | 0.0 | mg/l CaCO3 |
| Chloride (Cl) | 169 | mg/l CaCO3 |
| Fluoride (F) | <1.00 | mg/l CaCO3 |
| Hydroxide (OH) | 0.0 | mg/l CaCO3 |
| Nitrate (NO3) | 18.2 | mg/l CaCO3 |
| Phosphate (PO4) | 1770 | mg/l CaCO3 |
| Sulfate (SO4) | 6590 | mg/l CaCO3 |
| Barium (Ba) | <0.050 | mg/l |
| Calcium (Ca) | 4.24 | mg/l CaCO3 |
| Iron (Fe) | <0.020 | mg/l |
| Magnesium (Mg) | 0.858 | mg/l CaCO3 |
| Manganese (Mn) | <0.010 | mg/l |
| Potassium (K) | 260 | mg/l CaCO3 |
| Sodium (Na) | 5080 | mg/l CaCO3 |
| Free (CO2) | 62.1 | mg/l CaCO3 |
| Copper (Cu) | <0.020 | mg/l |
| Ammonia (NH3) | 3005 | mg/l CaCO3 |
| pH | 7.24 | |
| Total Silica (SiO2) | 45.48 | mg/l CaCO3 |
| Silicon (Si) | 26 | mg/l |
| Strontium (Sr) | <0.010 | mg/l |
| Zinc (Zn) | <0.020 | mg/l |

Table 5 shows the control with no coagulant added.

TABLE 5

| TESTS | RESULT | UNITS |
|---|---|---|
| Aluminum (Al) | 0.087 | mg/l |
| Bicarb (HCO3) | 1352.2 | mg/l CaCO3 |
| Bromide (Br) | 6.17 | mg/l CaCO3 |
| Carbonate (CO3) | 0.0 | mg/l CaCO3 |
| Chloride (Cl) | 200 | mg/l CaCO3 |
| Fluoride (F) | <1.00 | mg/l CaCO3 |
| Hydroxide (OH) | 0.0 | mg/l CaCO3 |
| Nitrate (NO3) | 21.6 | mg/l CaCO3 |
| Phosphate (PO4) | 4470 | mg/l CaCO3 |
| Sulfate (SO4) | 5890 | mg/l CaCO3 |
| Barium (Ba) | <0.050 | mg/l |
| Calcium (Ca) | 6.27 | mg/l CaCO3 |
| Iron (Fe) | <0.020 | mg/l |
| Magnesium (Mg) | 11.5 | mg/l CaCO3 |
| Manganese (Mn) | <0.010 | mg/l |
| Potassium (K) | 310 | mg/l CaCO3 |
| Sodium (a) | 5310 | mg/l CaCO3 |
| Free (CO2) | 53.4 | mg/l CaCO3 |
| Copper (Cu) | <0.020 | mg/l |
| Ammonia (NH3) | 3325 | mg/l CaCO3 |
| pH | 7.76 | |
| Total Silica (SiO2) | 119.13 | mg/l CaCO3 |
| Silicon (Si) | 67 | mg/l |
| Strontium (Sr) | 0.032 | mg/l |
| Zinc (Zn) | <0.020 | mg/l |

Table 6 shows the results on silica concentration when using an aluminum electrode in an electro-coagulation process.

TABLE 6

| TESTS | RESULT | UNITS |
|---|---|---|
| Aluminum (Al) | 0.077 | mg/l |
| Bicarb (HCO3) | 574.4 | mg/l CaCO3 |
| Bromide (Br) | 6.05 | mg/l CaCO3 |
| Carbonate (CO3) | 232.9 | mg/l CaCO3 |
| Chloride (Cl) | 190 | mg/l CaCO3 |
| Fluoride (F) | <1.00 | mg/l CaCO3 |
| Hydroxide (OH) | 0.0 | mg/l CaCO3 |
| Nitrate (NO3) | 15.4 | mg/l CaCO3 |
| Phosphate (PO4) | 1190 | mg/l CaCO3 |
| Sulfate (SO4) | 5910 | mg/l CaCO3 |
| Barium (Ba) | <0.050 | mg/l |
| Calcium (Ca) | 3.57 | mg/l CaCO3 |
| Iron (Fe) | <0.020 | mg/l |
| Magnesium (Mg) | 13.9 | mg/l CaCO3 |
| Manganese (Mn) | <0.010 | mg/l |
| Potassium (K) | 290 | mg/l CaCO3 |
| Sodium (Na) | 5010 | mg/l CaCO3 |
| Free (CO2) | 5.3 | mg/l CaCO3 |
| Copper (Cu) | <0.020 | mg/l |
| Ammonia (NH3) | 2246 | mg/l CaCO3 |
| pH | 8.54 | |
| Total Silica (SiO2) | 49.29 | mg/l CaCO3 |
| Silicon (Si) | 28 | mg/l |
| Strontium (Sr) | 0.031 | mg/l |
| Zinc (Zn) | 0.023 | mg/l |

Table 7 shows the results on silica concentration when using a 1:1 ratio of silica to ferric salts as a coagulant.

TABLE 7

| TESTS | RESULT | UNITS |
|---|---|---|
| Aluminum (Al) | 0.086 | mg/l |
| Bicarb (HCO3) | 863.0 | mg/l CaCO3 |
| Bromide (Br) | 6.14 | mg/l CaCO3 |
| Carbonate (CO3) | 0.0 | mg/l CaCO3 |
| Chloride (Cl) | 938 | mg/l CaCO3 |
| Fluoride (F) | <1.00 | mg/l CaCO3 |
| Hydroxide (OH) | 0.0 | mg/l CaCO3 |
| Nitrate (NO3) | 24.0 | mg/l CaCO3 |
| Phosphate (PO4) | 3180 | mg/l CaCO3 |
| Sulfate (SO4) | 5810 | mg/l CaCO3 |
| Barium (Ba) | <0.050 | mg/l |
| Calcium (Ca) | 10.4 | mg/l CaCO3 |
| Iron (Fe) | <0.020 | mg/l |
| Magnesium (Mg) | 5.15 | mg/l CaCO3 |
| Manganese (Mn) | <0.010 | mg/l |
| Potassium (K) | 290 | mg/l CaCO3 |
| Sodium (Na) | 5140 | mg/l CaCO3 |
| Free (CO2) | 55.7 | mg/l CaCO3 |
| Copper (Cu) | <0.020 | mg/l |
| Ammonia (NH3) | 3240 | mg/l CaCO3 |
| pH | 7.55 | |
| Total Silica (SiO2) | 114.79 | mg/l CaCO3 |
| Silicon (Si) | 64 | mg/l |
| Strontium (Sr) | <0.010 | mg/l |
| Zinc (Zn) | <0.020 | mg/l |

Example 3

With reference to FIG. 4, an ammonia recovery process may be integrated in accordance with one or more embodiments. Due to the high levels of ammonia in certain wastewaters, a dedicated ammonia treatment process may be needed before the membrane systems, as well as to treat concentrate from the membrane systems Ammonia reduction from the wastewater can consist of air stripping and bubbling through concentrated acid, or the use of other technologies such as a membrane contactor. In this example, a membrane contactor utilizing sulfuric acid was considered to treat the ammonia with the stream coming after the EC process. Table 8 presents simulated data of a 1000 gpm Liqui-Cel™ $NH_3$—N recovery system at varied recoveries. The ammonia recovery process typically requires higher pH (s.u. 8.5-11) to proceed and 90-99% of ammonia/ammonium can be recovered depending on the operating conditions Ammonium sulfate can be readily reused as fertilizer and resold.

TABLE 8

| Target NH3—N removal and recovery in system: | >90% | >95% | >99% |
| --- | --- | --- | --- |
| Contactor size/Membrane Type | 14 × 28 × 50 | 14 × 28 × 50 | 14 × 28 × 50 |
| Design ammonia-wastewater flow rate, gpm | 1000 | 1000 | 1000 |
| Design ammonia-water temperature, C. | 50 | 50 | 50 |
| Recommended acid used for capturing ammonia | Sulfuric Acid | Sulfuric Acid | Sulfuric Acid |
| Recommended adjusted pH of ammonia-containing water | 10 | 10 | 10 |
| Assumed pH of acid solution entering contactors | <2 | <2 | <2 |
| Design Inlet NH3—N concentration, ppm | 3,000 | 3,000 | 3,000 |
| Number of contactors in parallel | 18 | 16 | 24 |
| Number of contactors in series | 2 | 3 | 3 |
| No. of contactors needed, total | 36 | 48 | 72 |
| Projected NH3—N conc. after system, ppm | 255 | 117 | 31 |
| Projected NH3—N removal in system | 91% | 96% | 99% |
| Recommended acid strip CIRCULATION rate (System Total), gpm | 637 | 1021 | 1096 |
| Rate of ammonia removal, lbs./hr | 1374 | 1444 | 1486 |
| Calculated acid MAKE-UP rate required (System Total), lbs./hr | 3961 | 4161 | 4284 |
| Calculated Sulfate production rate, lbs./hr | 5335 | 5604 | 5770 |
| Estimated system wastewater DP, psi | 5 | 9 | 6 |
| Estimated Acid solution DP, psi | 11 | 16 | 12 |

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of treating phosphogypsum-containing water, comprising:
   promoting precipitation of at least one target constituent from the phosphogypsum-containing water in one or more steps to produce a supernatant water;
   introducing aluminum to the supernatant water using electrolytic addition from the electrolysis of an anode consisting of aluminum to provide a pretreated supernatant water having a reduced silica level;
   subjecting the pretreated supernatant water to membrane separation to produce treated water that meets at least one predetermined discharge requirement and a concentrate stream;
   recycling the concentrate stream back to a source of the phosphogypsum-containing water;
   removing ammonia from at least one of the pretreated supernatant water, upstream of the membrane separation, and the concentrate stream by membrane degasification;
   controlling a rate of the ammonia removal to maintain or reduce an ammonia concentration of the source of the phosphogypsum-containing water to offset ammonia present in the concentrate stream that is recycled back to the source of the phosphogypsum-containing water; and
   discharging the treated water.

2. The method of claim 1, wherein the one or more precipitation steps comprise a multi-step process.

3. The method of claim 2, wherein calcium and/or magnesium is precipitated in a first precipitation step of the one or more steps.

4. The method of claim 3, wherein phosphate is precipitated in a second precipitation step of the one or more steps.

5. The method of claim 4, further comprising a third precipitation step of the one or more steps.

6. The method of claim 4, further comprising recovering phosphate from a precipitation slurry associated with the second precipitation step.

7. The method of claim 3, further comprising adjusting a pH level of the phosphogypsum-containing water to a first pH level in the first precipitation step.

8. The method of claim 7, further comprising adjusting the first pH level to a second pH level in the second precipitation step.

9. The method of claim 3, further comprising recovering calcium fluoride from a precipitation slurry associated with the first precipitation step.

10. The method of claim 1, further comprising recovering phosphate from the pretreated supernatant following the introduction of the aluminum.

11. The method of claim 1, wherein the membrane separation involves one or more of nanofiltration, ultrafiltration, and reverse osmosis.

12. The method of claim 11, wherein the membrane separation comprises reverse osmosis and one of nanofiltration and ultrafiltration.

13. The method of claim 1, wherein the at least one predetermined discharge requirement pertains to a phosphorous level.

14. The method of claim 1, wherein ammonia is removed from the concentrate stream.

15. The method of claim 1, wherein ammonia is removed from the pretreated supernatant water.

16. The method of claim 1, wherein at least 90% of the ammonia removed from the at least one of the pretreated supernatant water and the concentrate stream is recovered.

17. The method of claim 16, further comprising delivering the recovered ammonia as a fertilizer product.

* * * * *